United States Patent
Deshpande et al.

(10) Patent No.: US 12,138,806 B2
(45) Date of Patent: Nov. 12, 2024

(54) MACHINE LEARNING-BASED ENVIRONMENT FAIL-SAFES THROUGH MULTIPLE CAMERA VIEWS

(71) Applicant: Siemens Aktiengesellschaft, Munich (DE)

(72) Inventors: Mayuri Deshpande, Charlotte, NC (US); Anant Kumar Mishra, Charlotte, NC (US)

(73) Assignee: Siemens Aktiengesellschaft, Munich (DE)

( * ) Notice: Subject to any disclaimer, the term of this patent is extended or adjusted under 35 U.S.C. 154(b) by 548 days.

(21) Appl. No.: 17/462,752

(22) Filed: Aug. 31, 2021

(65) Prior Publication Data
US 2023/0069482 A1 Mar. 2, 2023

(51) Int. Cl.
*B25J 9/16* (2006.01)
*G06T 7/00* (2017.01)
*G06T 7/77* (2017.01)

(52) U.S. Cl.
CPC ............... *B25J 9/1676* (2013.01); *G06T 7/77* (2017.01); *G06T 7/97* (2017.01); *G06T 2207/20081* (2013.01); *G06T 2207/20084* (2013.01); *G06T 2207/30232* (2013.01)

(58) Field of Classification Search
CPC . B25J 9/1676; G06T 7/77; G06T 7/97; G06T 2207/20081; G06T 2207/20084; G06T 2207/30232; G06F 18/214; G06V 40/10; G06V 20/52

USPC .......................................................... 382/209
See application file for complete search history.

(56) References Cited

U.S. PATENT DOCUMENTS

| | | | |
|---|---|---|---|
| 11,295,139 B2* | 4/2022 | Khadloya | G08B 13/19695 |
| 11,321,873 B1* | 5/2022 | Bauer | B64U 20/87 |
| 2015/0269427 A1 | 9/2015 | Kim et al. | |
| 2016/0070991 A1* | 3/2016 | Galera | G06V 40/103 348/77 |
| 2019/0007659 A1* | 1/2019 | Neubauer | G01B 11/14 |
| 2020/0349249 A1 | 11/2020 | Weston et al. | |

FOREIGN PATENT DOCUMENTS

| | | |
|---|---|---|
| WO | 2020088739 | 5/2020 |
| WO | 2021110226 | 6/2021 |

\* cited by examiner

*Primary Examiner* — Neil R McLean

(57) ABSTRACT

A computing system may include a fail-safe learning engine configured to access camera data captured by multiple cameras positioned within an environment during a learning phase, generate training data based on the camera data captured by the multiple cameras, and construct a human detection model using the training data. The computing system may also include a fail-safe trigger engine configured to access camera data captured by the multiple cameras positioned within the environment during an active phase, and the camera data captured during the active phase may include a target object. The fail-trigger engine may further be configured to provide, as an input to the human detection model, the camera data that includes the target object and execute a fail-safe action in the environment responsive to the determination, provided by the human detection model, indicating that the target object is a human.

12 Claims, 6 Drawing Sheets

MACHINE LEARNING-BASED ENVIRONMENT FAIL-SAFES THROUGH MULTIPLE CAMERA VIEWS

BACKGROUND

Modern industrial and manufacturing facilities can include robotics, machinery, and various other components of complex physical systems. Machine manufacturers may be required to satisfy threshold safety requirements to ensure the safety of humans present in such environments. Safety systems, whether directly implemented in machinery or as auxiliary environment components, can be used to address dangerous environment scenarios and override (e.g., force-stop) machine behavior to prevent human harm.

BRIEF DESCRIPTION OF THE DRAWINGS

Certain examples are described in the following detailed description and in reference to the drawings.

DETAILED DESCRIPTION

Figure 1:
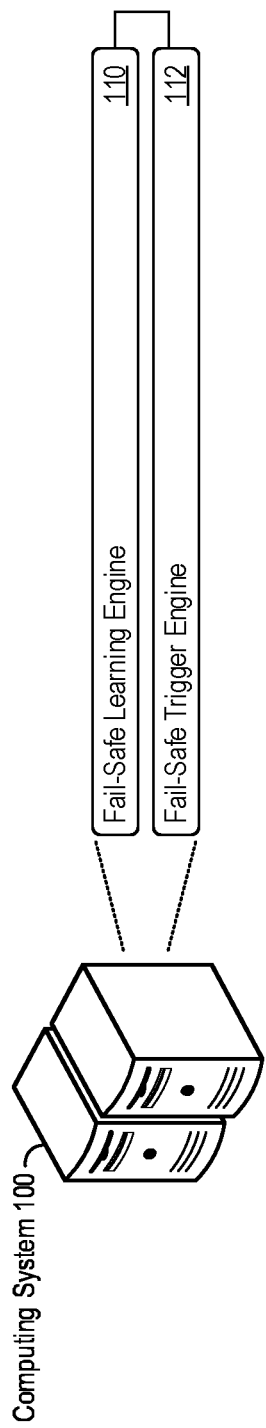
FIG. 1 shows an example of a computing system that supports machine learning-based environment fail-safes through multiple camera views.

In the design of modern environment layouts, human safety is becoming an increasingly relevant and important consideration. With ever-increasing advances in robotic systems, manufacturing machinery capabilities, and automated industrial system flows, the operational complexity of industrial environments is continually increasing. Ensuring that human operators present in such environments are not harmed by machine behavior is a necessary, yet challenging objective. As the operational capabilities and degrees of freedom of modern machinery increase, detection of human presences proximate to operational machinery may be required to address how such physical systems react and preserve human safety.

Basic safety and automation functions can be implemented in logic controllers or other machine components. For example, fail-safe devices, e.g., implemented as part of programmable logic controllers (PLCs), can be used to ensure the safety of human operators and factory personnel of a given environment. Fail-safe triggers in systems can be hardware based, and otherwise established for operator safety. However, conventional triggers to execute fail-safe actions in an environment may be simplistic and indiscriminate. As an illustrative example, optical systems such as light curtains or laser scanners can emit light beams in delineated areas of a factory floor. Interruptions to one or more of the light beams can indicate an object has entered into a restricted or unsafe portion of the factory floor, causing a fail-safe trigger or action to take place.

While light curtains and other optical systems can provide a measure of environment safety, such conventional solutions may be incapable of distinguishing between human and non-human intrusion into restricted environment areas. In such cases, fail-safe triggers may be issued even when non-human objects interrupt light beams of optical systems, causing machinery shut-downs and other responsive actions even when human safety is not at issue. For example, an automated guided vehicle (AGV) may traverse a factor floor and trigger a light curtain interruption, even though in this situation no human is in danger and the AGV may be programmed to avoid machinery collisions. Such indiscriminate fail-safe reactions, even though no human is in danger, may reduce the machinery uptime and operational efficiency of industrial environments. Some human detection technologies exist, but can be limited to binary outputs which can cause false positives and make troubleshooting and validation difficult.

The disclosure herein may provide systems, methods, devices, and logic that support machine learning-based environment fail-safes through multiple camera views. As described in greater detail herein, the machine learning-based environment fail-safe technology of the present disclosure may provide capabilities to utilize multiple camera views to train machine-learning models for human detection in various environment settings. The machine learning-based environment fail-safe technology may further provide increased capability and accuracy in detecting humans in video streams or other camera data, for example through application of Bayesian probabilistic modeling techniques and ensuring that multiple camera views confirm a target object is human beyond a threshold probability. As yet another feature of the machine learning-based environment fail-safe technology presented herein, triangulation techniques may be applied to determine proximity to fail-safe boundaries in an environment. Through a combination of human presence and proximity conditions to trigger fail-safe responses, machine learning-based environment fail-safe features may reduce false positives in safety programs, which can in-turn improve factory and industrial environment performance.

In some implementations, the machine learning-based environment fail-safe technology disclosed herein may generate training data for human detection models through simulation environments in which specific manufacturing scenarios and proper safety outcomes can be accounted for. Through such simulation environments, a wealth of simulation scenarios and large amounts of training data can be generated to train human detection models and improve human detection processes for fail-safe responses. Through any combination of precise object location determinations, end-to-end-simulation frameworks, and improved machine learning-based human detection capabilities as described herein, the machine learning-based environment fail-safe features of the present disclosure can detect human presences in environments with increased speed, reliability, and energy-efficiency, without reduced false positives and over-sensitivity that can reduce unneeded fail-safe interruptions and improve production efficiency.

These and other features as well as technical benefits of the disclosed machine learning-based environment fail-safe technology are described in greater detail herein.

FIG. 1 shows an example of a computing system 100 that supports machine learning-based environment fail-safes through multiple camera views. The computing system 100 may take various forms, and may include a single or multiple computing devices such as application servers, compute nodes, desktop or laptop computers, smart phones or other mobile devices, tablet devices, embedded controllers, or any hardware component or physical system that includes embedded software. The computing system 100 may take the form of any system with computing capabilities by which machine learning models for environment fail-safes can be trained, used, or otherwise applied.

The computing system 100 may be implemented in various ways to provide any of the machine learning-based environment fail-safe features described herein. As an example implementation, the computing system 100 shown in FIG. 1 includes a fail-safe learning engine 110 and a fail-safe trigger engine 112. The computing system 100 may implement the engines 110 and 112 (and components thereof) in various ways, for example as hardware and programming. The programming for the engines 110 and 112 may take the form of processor-executable instructions stored on a non-transitory machine-readable storage medium and the hardware for the engines 110 and 112 may include a processor to execute those instructions. A processor may take the form of single processor or multi-processor systems, and in some examples, the computing system 100 implements multiple engines using the same computing system features or hardware components (e.g., a common processor or a common storage medium).

In operation, the fail-safe learning engine 110 may access camera data captured by multiple cameras positioned within an environment during a learning phase, generate training data based on the camera data captured by the multiple cameras, and construct a human detection model using the training data. The human detection model may be configured to provide a determination indicative of whether a given object within a view of a camera in the environment is a human or not. In operation, the fail-safe trigger engine 112 may access camera data captured by the multiple cameras positioned within the environment during an active phase, and the camera data captured during the active phase may include a target object. The fail-safe trigger engine 112 may further provide, as an input to the human detection model, the camera data that includes the target object and execute a fail-safe action in the environment responsive to the determination, provided by the human detection model, indicating that the target object is a human.

These and other machine learning-based environment fail-safe features according to the present disclosure are described in greater detail next. Example features with regards to training human detection models in learning phases are described with reference to FIG. 2. Example features with regards to environment fail-safe triggers in active phases is described with reference to FIG. 3.

Figure 2:
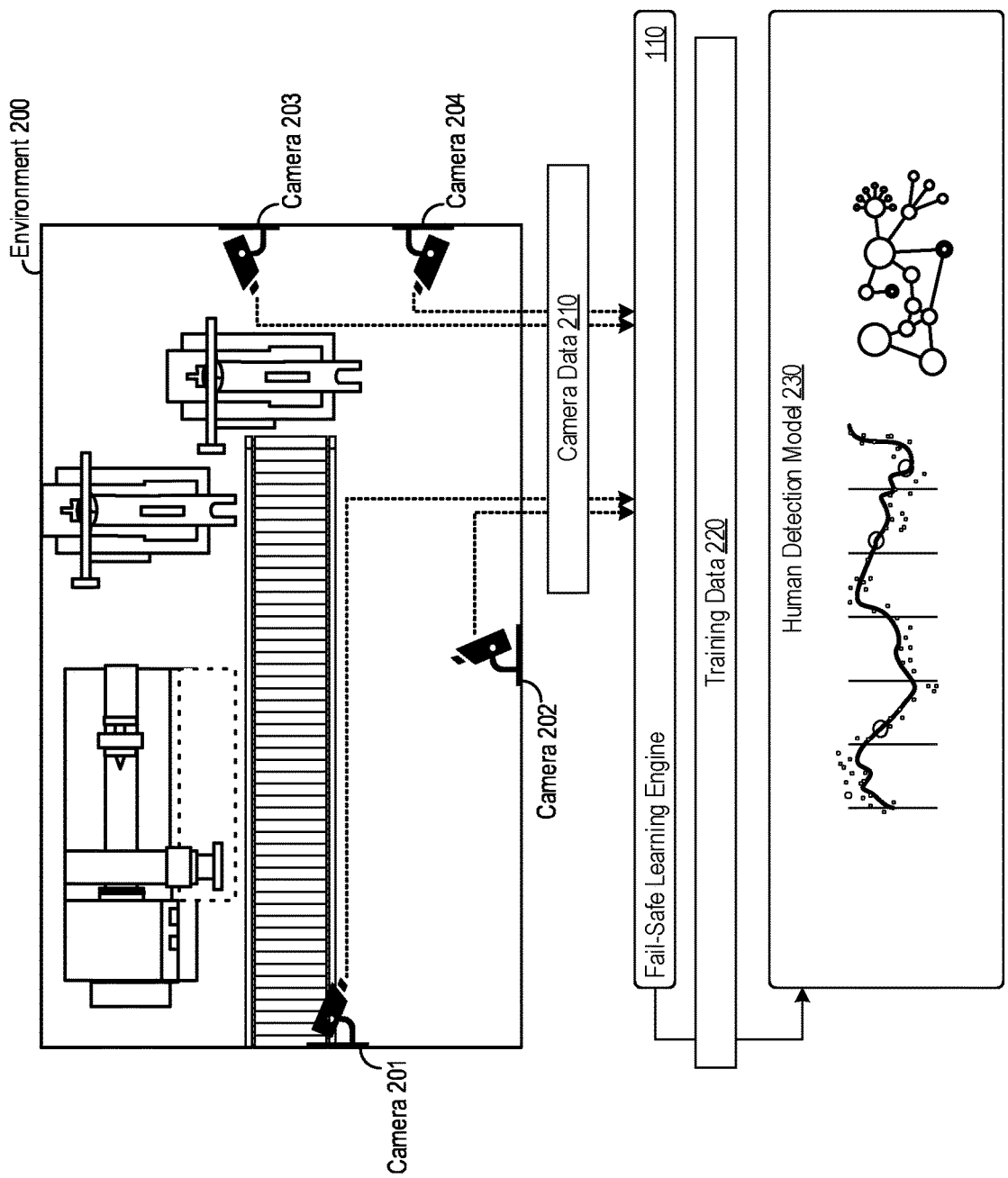
FIG. 2 shows an example construction of a human detection model through camera data captured by multiple cameras in an environment.

FIG. 2 shows an example construction of a human detection model through camera data captured by multiple cameras in an environment. The machine learning-based environment fail-safe technology of the present disclosure may be applied to any type of environment, such as industrial settings, factory floors, manufacturing facilities, fabrication labs, warehouses, or any other physical location in which human safety protocols and safeguards can be implemented. In the example of FIG. 2, an environment 200 is shown in which any of the various machine learning-based environment fail-safe features of the present disclosure can be implemented. The environment 200 may include multiple cameras positioned within the environment 200, such as the cameras 201-204 depicted in FIG. 2. Through camera data captured by a multi-camera system of an environment, the fail-safe learning engine 110 may construct machine learning models configured to detect human presences in such environments.

In a learning phase of model construction, the fail-safe learning engine 110 may construct machine learning models (e.g., human detection models) by training the machine learning models with training data comprised of captured camera data. To illustrate through FIG. 2, the fail-safe learning engine 110 may obtain camera data 210 captured by the cameras 201-204 for the environment 200. The camera data 210 may take the form of video streams of camera frames (also referred to herein as video frames) or any other video data generated by cameras within the environment 200. As the cameras 201-204 may be positioned at different locations within the environment 200, the camera data 210 may capture different poses, angles, perspectives, and locations in a field of view of the cameras 201-204, and the camera data 210 may be used for analysis and training of machine learning models to detect human presences. As noted herein, such machine learning models may be referred to as human detection models. Human detection models constructed by the fail-safe learning engine 110 may be configured to provide a determination (e.g., output) indicative of whether a given object within a view of a camera in an environment is a human or not.

The fail-safe learning engine 110 may construct (e.g., train) human detection models through training data. In FIG. 2, the fail-safe learning engine 110 uses the training data 220 to construct the human detection model 230. The fail-safe learning engine 110 may construct the training data 220 from the camera data 210 captured by the multiple cameras 201-204 within the environment 200 in any suitable manner. The training data 220 may be labeled by the fail-safe learning engine 110 (e.g., expressly tagged or marked to identify video frames with humans captured in the video data) or unlabeled. In that regard, the training data 200 may be generated as any labeled or processed form of the camera data 210 or otherwise comprise the camera data 210. The fail-safe learning engine 110 may generate the training data 220 from the camera data 210 in any suitable way, and may do so specific to the machine learning capabilities implemented or applied by the human detection model 230.

Through the training data 220 (e.g., labeled camera frames), the fail-safe learning engine 110 may train the human detection model 230. The fail-safe learning engine 110 may itself implement or otherwise construct the human detection model 230 as any type of machine-learning model trained according to any combination of machine-learning techniques, processes, or algorithms. As such, the human detection model 230 may implement or provide any number of machine learning techniques to analyze and interpret camera data, doing so specifically for human detection. For instance, the human detection model 230 may implement any number of supervised, semi-supervised, unsupervised, or reinforced learning models to interpret labeled or unlabeled video frames captured by the multiple cameras 201-204 positioned within the environment 200. In some implementations, the fail-safe learning engine 110 may implement the human detection model 230 as a convolutional neural network model, any type of classification model, or as any other suitable machine learning model.

By utilizing training data 220 (and underlying camera data 210) obtained from different perspectives, angles, and orientations from a multi-camera system positioned within the environment 200, the fail-safe learning engine 110 may construct the human detection model 230 to output human presence determinations with increased reliability. Human feature information in each of the various video streams captured by the cameras 201-204 may be accounted for in training the human detection model 230. As one example, the human detection model 230 may analyze training data 220 (e.g., labeled camera frames) to learn human movement features as a human operator in the environment 200 traverses down a hallway or floor path of the environment 200 and is sequentially captured by various individual cameras of a multi-camera system. As such and through sequential human features captured by sequential camera views, the human detection model 230 may improve machine learning-based determinations that a moving object in the environment 200 is a human (and not another mobile component of an industrial system, such as an AGV). Such a sequential nature of human movement (and corresponding object features) may be leveraged by the fail-safe learning engine 110 through probabilistic indicators and weighting applied by the human detection model 230.

In some implementations, the fail-safe learning engine 110 may construct the human detection model 230 such that the determination provided by the human detection model 230 is a probability indicator indicative of a probability that a given object within a view of a camera in the environment 200 is a human or not. As opposed to some conventional machine learning techniques and classification models that provide a binary indicator output (e.g., human or not-human), the fail-safe learning engine 110 may implement the human detection model 230 to output probabilistic indicators. To do so, the fail-safe learning engine 110 may implement any number of Bayesian update capabilities in the human detection model 230, e.g., as a Bayesian neural network. Instead of point estimate weights in a neural network, the human detection model 230 constructed by the fail-safe learning engine 110 may be configured to approximate or generate a probabilistic distribution of weights, e.g., as a Gaussian or normal distribution with multiple hyper-parameters (such as mean and standard deviation), doing so based on prior information and data included in the camera data 210 captured by the cameras 201-204.

Through probabilistic weighting or Bayesian updates, the human detection model 230 may adaptively learn and optimize human detection capabilities in analysis of video streams from a multi-camera system. For a given input camera stream, the human detection model 230 may implement or formulate a local probability distribution function using human detection probabilities from multiple other camera streams, considering the presence of human feature information in these other camera streams (or lack thereof). The objective of the local probability distribution of the human detection model 230 may be configured to compute a sequential Bayesian update based on camera data captured from multiple cameras in the environment 200, and doing so may aid in increasing coverage of considered portions/video data of the environment 200 in which human presence has been determined by the human detection model 230 with high certainty (e.g., beyond a probability threshold, such as >95% probability or any other configurable threshold). The sequential nature of such a probability distribution function may be leveraged by the fail-safe learning engine 110 (via the human detection model 230) as each of the multiple cameras 201-204 may capture objects (e.g., humans) at a given location, and human detection at other preceding locations may be used as a prior in initializing or specifying the probability distribution function for a given camera stream analyzed by the human detection model 230.

In any of the ways described herein, the fail-safe learning engine 110 may construct the human detection model 230 using training data 220 generated via camera data 210 captured by a multi-camera system of an environment 200. Note that the fail-safe learning engine 110 may obtain camera data 210 that captures an environment 200 physically, virtually, or as a combination of both. For virtually-obtained camera data, the fail-safe learning engine 110 may utilize a simulation framework in which avatar movements are simulated in a virtual version of the environment 200. To utilize such virtual environments, the fail-safe learning engine 110 may obtain motion data from human users, e.g., captured via vision sensors. Such captured motion data may mimic, target, or correlate to actual motions of human operators within the environment 200. The fail-safe learning engine 110 may extract skeletal information from the motion data, e.g., using a skeleton pose estimator algorithm, such as Open Pose or any other viable algorithm. Through the skeletal information or motion data, the fail-safe learning engine 110 may configure and animate avatars within a virtual version of the environment 200. In this virtual version of the environment 200, virtual versions of the cameras 201-204 may be positioned at positions to the physical environment. As such, the virtual view captured at these camera positions may be virtual camera data depicting animated or virtual human avatar movement.

Through such virtual environments, real-time video streams of a simulated environment with simulated human activity can be captured from the different perspectives of the multiple (virtual) cameras positioned within the virtual environment. Such camera data may be used by the fail-safe learning engine 110 to construct training data to train human detection models. Thus, learning phases for construction human detection models may be supported through simulation frameworks. As simulated activity of avatars within a virtual environment can be configured to include any number of scenarios, poses, and movements, virtual or simulation-based training of human detection models may increase the learning capabilities of such machine learning models and support human presence determinations with increased accuracy and robustness. Moreover, such a simulation framework need not be programmed with explicit rules, but the human detection model 230 (e.g., implemented as a neural network) may be trained with massive amounts of simulation data that can depict nearly every possible environment scenario, even prior to active phase deployments into real-time or live fail-safe scenarios in the environment 200.

Thus, the fail-safe learning engine 110 may construct human detection models during a learning phase of the machine learning-based environment fail-safe technology described herein. In an active phase, a fail-safe trigger engine 112 may utilize constructed human detection models to monitor environments and execute fail-safe actions using the constructed human detection models. Example features of fail-safe triggers according to the present disclosure are described next with reference to FIG. 3.

Figure 3:
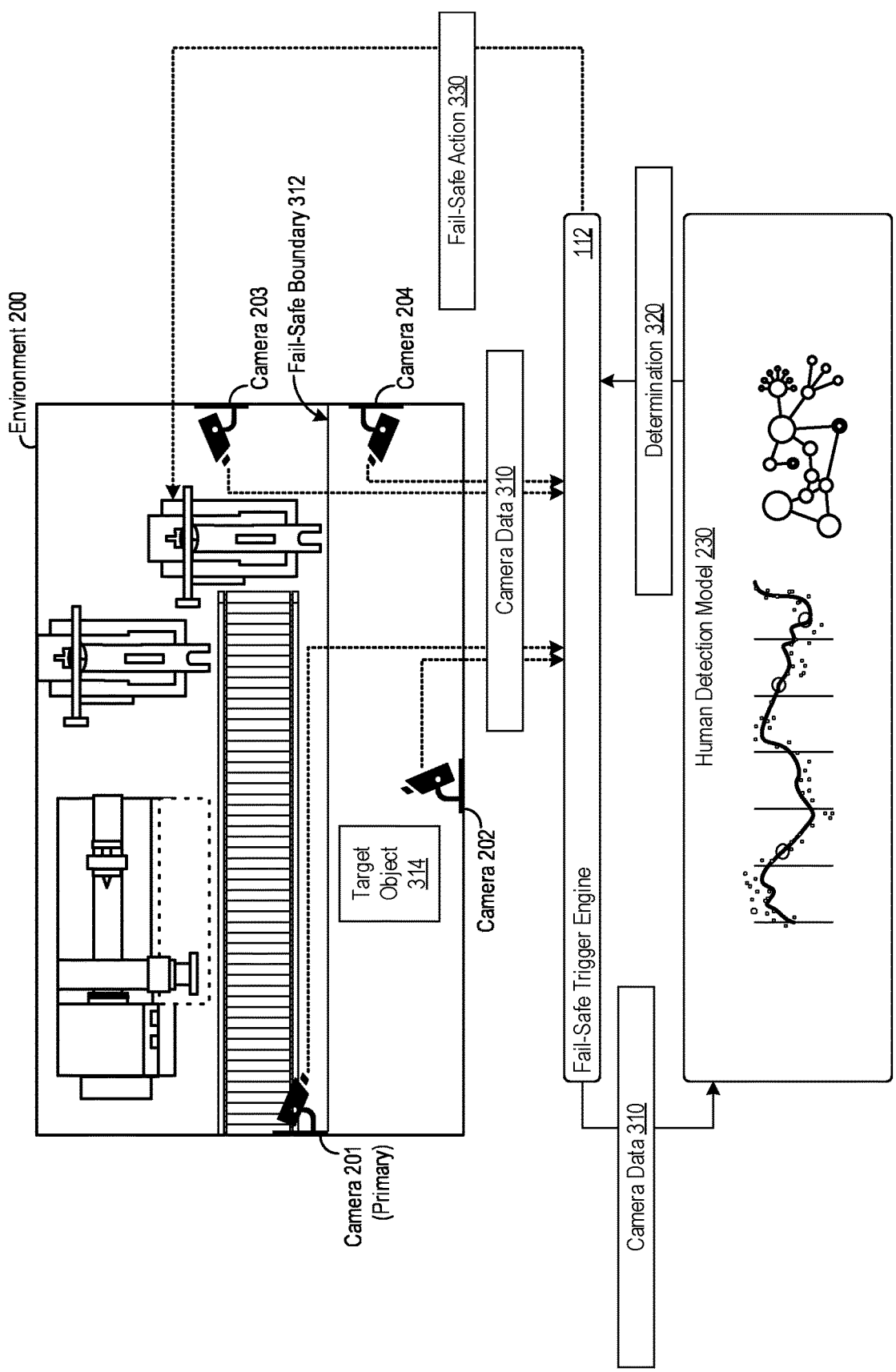
FIG. 3 shows an example execution of a fail-safe action in an environment responsive to a determination provided by a human detection model.

FIG. 3 shows an example execution of a fail-safe action in an environment responsive to a determination provided by a human detection model. In the example of FIG. 3, the fail-safe trigger engine 112 may operate as (or implement) fail-safe logic applied to the environment 200, and may thus implemented as part of fail-safe PLCs, machinery, safety systems, any other component within the environment 200 or otherwise connected to the environment 200. The fail-safe trigger engine 112 may monitor an environment 200 and issue fail-safe operations based on the monitoring. The fail-safe trigger engine 112 may monitor the environment 200 through (at least in part) camera data captured by multiple cameras positioned within the environment 200, such as the cameras 201-204 shown in FIG. 3. Through real-time camera data captured by such multi-camera systems of an environment, the fail-safe trigger engine 112 may determine when to execute fail-safe actions.

In the example shown in FIG. 3, the fail-safe trigger engine 112 obtains camera data 310 captured by the cameras 201-204 and determines whether to execute a fail-safe action based on the captured camera data 310. In some implementations, the fail-safe trigger engine 112 may determine to execute a fail-safe action responsive to satisfaction of any number of fail-safe conditions, such as responsive to a determination that a human is within a threshold distance from a fail-safe boundary in the environment 200. A fail-safe boundary may refer to any location delineator within an environment, may be 2D or 3D in delineation, and may take any form or shape. An example of a fail-safe boundary is shown in FIG. 3 as the fail-safe boundary 312, which may be a 3D plane proximate to an assembly line and machinery in the environment 200. Fail-safe boundaries may be user-configurable, e.g., set through user inputs that set safety parameters for the safety systems of an environment 200. In that regard, proximity to such fail-safe boundaries (e.g., crossing the fail-safe boundary 312) may be used to define "dangerous" scenarios in which human safety is compromised.

The fail-safe trigger engine 112 may issue or execute fail-safe actions responsive to satisfaction of a human presence condition and a proximity condition. For instance, responsive to a determination that an object included in captured camera data of the environment 200 is a human and that the human is within a threshold distance from the fail-safe boundary 312, the fail-safe trigger engine 112 may execute a fail-safe action (e.g., machinery shut down). To provide an illustrative example, the environment 200 depicted in FIG. 3 includes a target object 314. The fail-safe trigger engine 112 may determine whether the target object 314 is a human or not (human presence condition) and determine whether the location of the target object 314 is within a threshold distance from the fail-safe boundary 312 (proximity condition). Example features of each of these determination processes are described in turn.

To determine human presence in the environment 200, the fail-safe trigger engine 112 may process captured camera data via the human detection model 230. In doing so, the fail-safe trigger engine 112 may the access camera data 310 captured by some or all of the multiple cameras 201-204 positioned within the environment 200 during an active phase and provide the camera data 310 as an input to the human detection model 230. The camera data 310 in FIG. 3 includes the target object 314, and the human detection model 230 may be configured to provide a determination as to whether the target object 314 is a human or not. In some implementations, the fail-safe trigger engine 112 pre-processes the camera data 310 into a format or form interpretable by the human detection model 230, e.g., as video frames of a particular format, frequency, or according to any other configurable video parameters. As the human detection model 230 may be configured to provide a determination as to whether objects within the field of view of cameras in the environment 200 or human or not, the fail-safe trigger engine 112 may determine human presence in the environment 200 through trained machine learning models and techniques according to the features described herein.

In FIG. 3, the human detection model 230 generates the determination 320 based on the camera data 310, and the determination 320 may indicate whether the target object 314 included in the camera data 310 is a human or not. The fail-safe trigger engine 112 may respond according to the determination 320 provided by the human detection model 230. In some implementations, the human detection model 230 may provide the determination 320 based on multiple views of the target object 314 as captured by the multiple cameras 201-204 in the environment 200. The fail-safe trigger engine 112 may consider the multiple camera views and apply the human detection model 230 in various ways, whether in parallel, in combination, through primary and secondary camera views, and more.

In some implementations, the fail-safe trigger engine 112 may identify a particular camera in the multi-camera system of an environment 200 as the primary camera for a given fail-safe boundary. In the example of FIG. 3, the fail-safe trigger engine 112 determines the camera 201 as the primary camera for the fail-safe boundary 312 (e.g., via user configuration). The camera 201 may be positioned, for example, to directly align, view, or capture the fail-safe boundary 312 and may thus provide a primary indicator of whether an object has crossed the fail-safe boundary 312. In such examples, the fail-safe trigger engine 112 may access primary camera data captured by a primary camera of the multiple cameras (in this case the camera 201, which includes the target object 314). When the determination 320 provided by the human detection model 230 indicates the target object 314 is a human, then the fail-safe trigger engine 112 may further consider secondary camera data captured by other cameras in the multi-camera system, e.g., the cameras 202-204. The secondary camera data may also be provided for consideration by the human detection model 230, and doing so may provide a multi-tiered consideration of the target object 314 in the environment 200 for human presence determinations.

Such multi-tiered consideration of a target object 314 for human presence determinations may increase the accuracy and reliability of fail-safe technology in the environment 200. With a lesser number of false positives through multi-view analysis, the machine learning-based environment fail-safe features of the present disclosure may more accurately determine human presence in environments, and thus increase the efficacy of fail-safe activations and factory efficiencies. Moreover, through probabilistic machine learning techniques (e.g., Bayesian updates), the machine learning-based environment fail-safe technology of the present disclosure may support human presence determinations through probabilistic determinations across multiple camera views, which may improve the accuracy of such determinations as compared to binary human determinations of conventional technologies based on single camera views.

As one implementation example, the fail-safe trigger engine 112 may access primary camera data captured by a primary camera of the multiple cameras in an environment 200, the primary camera data including the target object 314 and provide, as the input to the human detection model 230, the primary camera data. In response to a probability indicator, provided by the human detection model 230 for the primary camera data, indicating that the probability that the target object 314 is a human is greater than a probabilistic threshold, the fail-safe trigger engine 112 may access secondary camera data captured by a secondary camera of the multiple cameras (e.g., the camera 202, 203, or 204). The secondary camera data may include the target object 314 at a different perspective from the primary camera data. Then, the fail-safe trigger engine 112 may provide, as another input to the human detection model 230, the secondary camera data. The fail-safe trigger engine 112 may determine the target object 314 as a human responsive to the probability indicator, provided by the human detection model 230 for the secondary camera data, indicating that the probability that the target object 314 is a human is also greater than the probabilistic threshold. In other examples, the fail-safe trigger engine 112 may apply a different probabilistic threshold to the secondary camera data, whether more restrictive of more relaxed as compared to the probabilistic threshold applied to the primary camera data.

In any such way, the fail-safe trigger engine 112 may determine whether the target object 314 included in camera data 310 captured for the environment 200 is a human or not (e.g., beyond a probabilistic threshold). In parallel or in sequence, the fail-safe trigger engine 112 may determine whether the target object 314 is within a threshold distance from the fail-safe boundary 312 of the environment 200. Both a human presence condition and proximity condition may need to be satisfied in order for the fail-safe trigger engine 112 to execute a fail-safe action. Put another way, the fail-safe trigger engine 112 may execute a fail-safe action in the environment 200 responsive to both (1) a determination, provided by the human detection model 230, indicating that the target object 314 is a human and (2) a determination that a position of the target object 314 within the environment 200 is within a threshold distance from the fail-safe boundary 312 in the environment 200. As such, the fail-safe trigger engine 112 may determine that a human presence condition and that a proximity condition has been satisfied for a target object in order to trigger execution of a fail-safe action in the environment 200.

For position determinations within the environment 200, the fail-safe trigger engine 112 may employ any number of triangulation techniques. The fail-safe trigger engine 112 may be configured to determine the position of the target object 314 within the environment 200 through a triangulation process via the camera data 310 captured from the multiple cameras 201-204 in the environment 200. For example, the fail-safe trigger engine 112 may perform a triangulation process by accessing a first 2-dimensional (2D) camera frame of the camera data 310 that depicts the target object 314, wherein the first 2D camera frame is captured by a first camera of the multiple cameras, accessing a second 2D camera frame of the camera data 310 that depicts the target object 314, wherein the second 2D camera frame is captured by a second camera of the multiple cameras different from the first camera, and triangulating a 3-dimensional position of the target object 314 from the first 2D camera frame and the second 2D camera frame based on positioning of the first and second cameras within the environment 200.

Camera perspectives and locations of the cameras 201-204 may be determined by the fail-safe trigger engine 112 via YOLO3 or any other viable camera or video technologies. Camera parameters such as optical axes orientations, focal lengths, baselines, corresponding image points in the triangulated camera frames, and more may be used by the fail-safe trigger engine 112 to determine the 3D position of the target object 314 via triangulation. Through the determined 3D position of the target object 314 in the environment 200, the fail-safe trigger engine 112 may make a location determination for the target object 314 with respect to the fail-safe boundary 312. When the location of the target object 314 is within the threshold distance of the fail-safe boundary 312 (e.g., crossing the fail-safe boundary 312), the fail-safe trigger engine 112 may determine that the proximity condition for fail-safe activation has been satisfied.

Responsive to a determination that both the human presence condition (e.g., via the human detection model 230 through primary and secondary camera data) and the proximity condition (e.g., via triangulation of multiple camera frames) have been satisfied for the target object 314, the fail-safe trigger engine 112 may execute a fail-safe action. Any suitable fail-safe action is contemplated herein, and the fail-safe trigger engine 112 may execute a fail-safe action by issuing commands to machinery or other physical components in the environment 200. In the example of FIG. 3, the fail-safe trigger engine 112 transmits the fail-safe action 330 to a particular machine in the environment 200 with a surrounding area restricted by the fail-safe boundary 312, and the fail-safe action 330 may be a shut-down command responsive to detection of human presence proximate to the particular machine as delineated via the fail-safe boundary 312.

As the fail-safe trigger engine 112 may apply both a human presence condition and a proximity condition, the machine learning environment fail-safe technology of the present disclosure may improve environment efficiency by reducing false-positives as compared to indiscriminate conventional safety technologies (like light curtains). If either of the human presence condition or proximity condition are not satisfied, the fail-safe trigger engine 112 may determine not to execute the fail-safe action. Thus, even if a target object is proximate to a given environment location, the machine learning environment fail-safe technology of the present disclosure need not execute fail-safe actions unless the target object is also determined to be human. By doing so, AGVs or other non-human components of the environment 200 need not trigger costly fail-safe actions that can greatly reduce productivity and output yields of industrial environments. Even if human presence is detected within the environment 200, fail-safe actions may be performed only when such human detection is proximate to fail-safe boundaries, which may also reduce unwarranted machinery shut-downs or other fail-safe triggers. Through continuous or real-time monitoring of environments during such an active phase, the machine learning environment fail-safe technology of the present disclosure may provide improved fail-safe implementations for environments of any type.

While many machine learning-based environment fail-safe features have been described herein through illustrative examples presented through various figures, the fail-safe learning engine 110 and fail-safe trigger engine 112 may implement any combination of the machine learning-based environment fail-safe features described herein.

Figure 4:
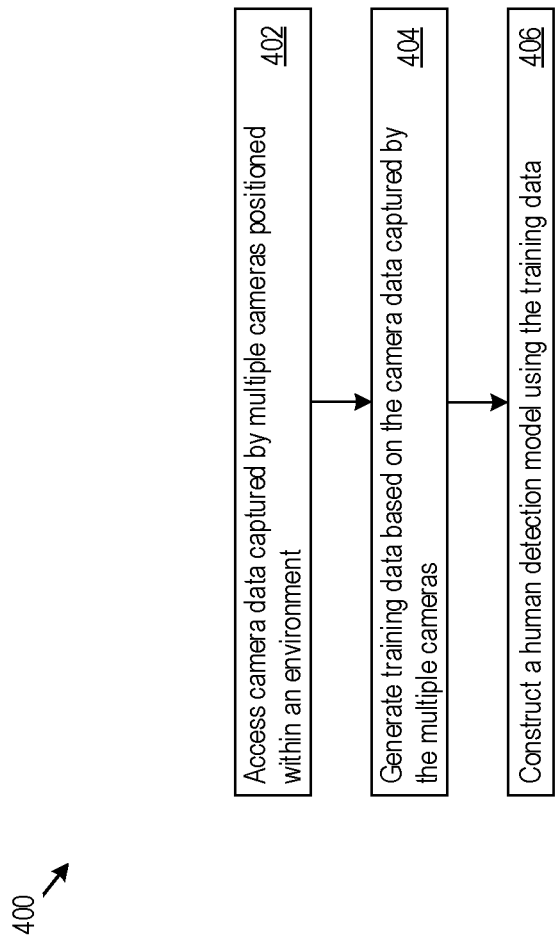
FIG. 4 shows an example of logic that a system may implement to support learning phase training of human detection models using camera data from multiple different cameras.

FIG. 4 shows an example of logic 400 that a system may implement to support learning phase training of human detection models using camera data from multiple different cameras. For example, the computing system 100 may implement the logic 400 as hardware, executable instructions stored on a machine-readable medium, or as a combination of both. The computing system 100 may implement the logic 400 via the fail-safe learning engine 110, through which the computing system 100 may perform or execute the logic 400 as a method construct human detection models from camera data captured for an environment through a multi-camera system. The following description of the logic 400 is provided using the fail-safe learning engine 110 as an implementation example. However, various other implementation options by the computing system 100 are possible.

In implementing the logic 400, the fail-safe learning engine 110 may access camera data captured by multiple cameras positioned within an environment (402), for example doing so during a learning phase. The fail-safe learning engine 110 may further generate training data based on the camera data captured by the multiple cameras (404) and construct a human detection model using the training data (406). The fail-safe learning engine 110 may do so in any of the various ways described herein. As such, the fail-safe learning engine 110 may train human detection models configured to provide a determination of whether a given object within a view of a camera in the environment is a human or not.

Figure 5:
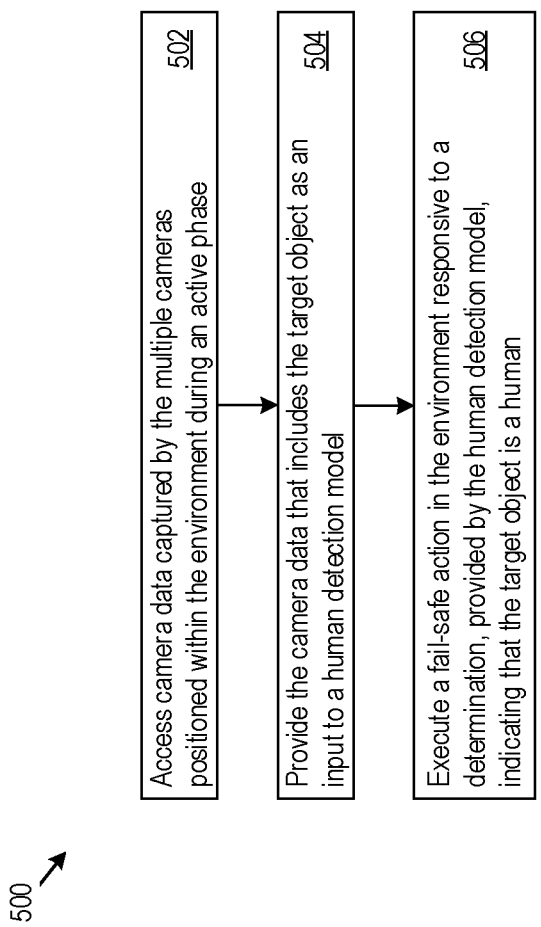
FIG. 5 shows an example of logic 500 that a system may implement to support execution of fail-safe actions in an environment based on camera data captured by multiple cameras in the environment.

FIG. 5 shows an example of logic 500 that a system may implement to support execution of fail-safe actions in an environment based on camera data captured by multiple cameras in the environment. For example, the computing system 100 may implement the logic 500 as hardware, executable instructions stored on a machine-readable medium, or as a combination of both. The computing system 100 may implement the logic 500 via the fail-safe trigger engine 112, through which the computing system 100 may perform or execute the logic 500 as a method to execute fail-safe actions in an environment based on camera data captured by multiple cameras in the environment. The following description of the logic 500 is provided using the fail-safe trigger engine 112 as an implementation example. However, various other implementation options by the computing system 100 are possible.

In implementing the logic 500, the fail-safe trigger engine 112 may access camera data captured by the multiple cameras positioned within the environment during an active phase (502), and the camera data captured during the active phase may include a target object. The fail-safe trigger engine 112 may further provide the camera data that includes the target object as an input to a human detection model (504) as well as execute a fail-safe action in the environment responsive to a determination, provided by the human detection model, indicating that the target object is a human (506). In such a way, the fail-safe trigger engine 112 may execute a fail-safe action based on a human presence condition for a target object in the environment. Note that the fail-safe trigger engine 112 engine may also apply a proximity condition for the target object as well, and execute the fail-safe action responsive to a determination that both the human presence and proximity conditions are satisfied.

The logic shown in FIGS. 4 and 5 provide examples by which a system may support machine learning-based environment fail-safes through multiple camera views. Additional or alternative steps in the logic 400 and/or logic 500 are contemplated herein, including according to any features described herein for the fail-safe learning engine 110, the fail-safe trigger engine 112, or combinations of both.

Figure 6:
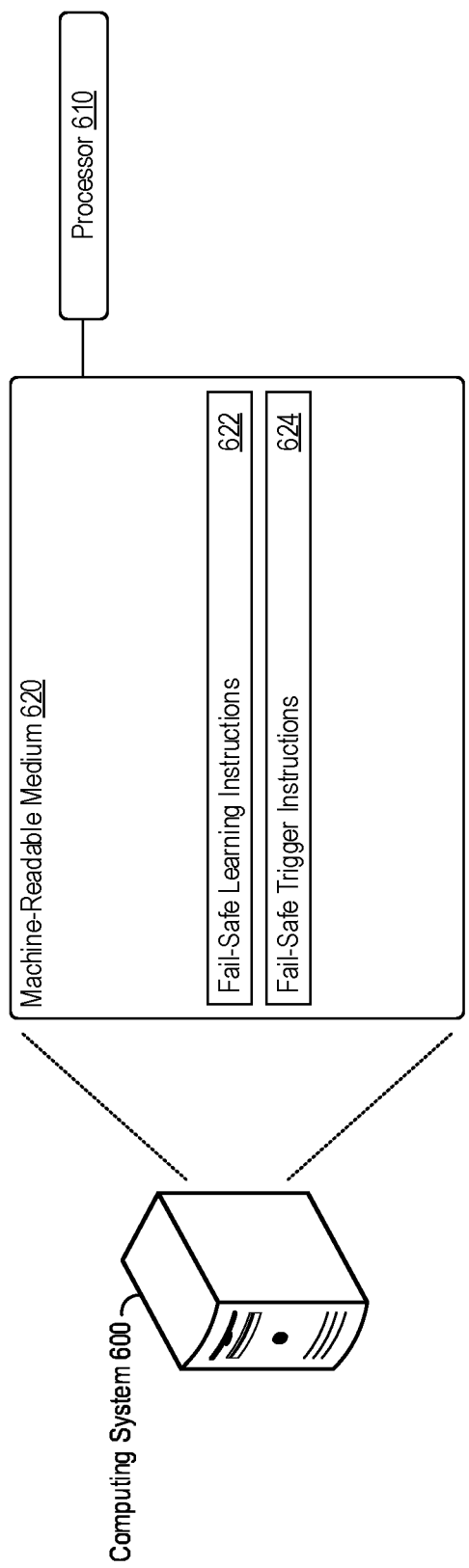
FIG. 6 shows an example of a computing system that supports machine learning-based environment fail-safes through multiple camera views.

FIG. 6 shows an example of a computing system 600 that supports machine learning-based environment fail-safes through multiple camera views. The computing system 600 may include a processor 610, which may take the form of a single or multiple processors. The processor(s) 610 may include a central processing unit (CPU), microprocessor, or any hardware device suitable for executing instructions stored on a machine-readable medium. The computing system 600 may include a machine-readable medium 620. The machine-readable medium 620 may take the form of any non-transitory electronic, magnetic, optical, or other physical storage device that stores executable instructions, such as the fail-safe learning instructions 622 and the fail-safe trigger instructions 624 shown in FIG. 6. As such, the machine-readable medium 620 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 600 may execute instructions stored on the machine-readable medium 620 through the processor 610. Executing the instructions (e.g., the fail-safe learning instructions 622 and fail-safe trigger instructions 624) may cause the computing system 600 to perform any of the machine learning-based environment fail-safe features described herein, including according to any of the features with respect to the fail-safe learning engine 110, the fail-safe trigger engine 112, or combinations of both.

For example, execution of the fail-safe learning instructions 622 by the processor 610 may cause the computing system 600 to access camera data captured by multiple cameras positioned within an environment during a learning phase, generate training data based on the camera data captured by the multiple cameras, and construct a human detection model using the training data. The human detection model may be configured to provide a determination indicative of whether a given object within a view of a camera in the environment is a human or not. Execution of the fail-safe trigger instructions 624 by the processor 610 may cause the computing system 600 to access camera data captured by the multiple cameras positioned within the environment during an active phase, and the camera data captured during the active phase may include a target object. Execution of the fail-safe trigger instructions 624 may further cause the computing system 600 provide, as an input to the human detection model, the camera data that includes the target object and execute a fail-safe action in the environment responsive to the determination, provided by the human detection model, indicating that the target object is a human.

Any additional or alternative features as described herein may be implemented via the fail-safe learning instructions 622, fail-safe trigger instructions 624, or a combination of both.

The systems, methods, devices, and logic described above, including the fail-safe learning engine 110 and the fail-safe trigger engine 112, may be implemented in many different ways in many different combinations of hardware, logic, circuitry, and executable instructions stored on a machine-readable medium. For example, the fail-safe learning engine 110, the fail-safe trigger engine 112, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the fail-safe learning engine 110, the fail-safe trigger engine 112, or combinations thereof.

The processing capability of the systems, devices, and engines described herein, including the fail-safe learning engine 110 and the fail-safe trigger engine 112, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A system comprising:
    a processor; and
    a non-transitory machine-readable medium comprising instructions that, when executed by the processor, cause a computing system to:
        access camera data captured by multiple cameras positioned within an environment during a learning phase;
        generate training data based on the camera data captured by the multiple cameras; and
        construct a human detection model using the training data, the human detection model configured to provide a determination indicative of whether a given object within a view of a camera in the environment is a human or not, wherein the determination provided by the human detection model is a probability indicator indicative of a probability that the given object within a view of a camera in the environment is a human or not;
        access camera data captured by the multiple cameras positioned within the environment during an active phase, wherein the camera data captured during the active phase includes a target object, including by accessing primary camera data captured by a primary camera of the multiple cameras, the primary camera data including the target object;
        provide, as an input to the human detection model, the camera data that includes the target object, including the primary camera data;
        in response to the probability indicator, provided by the human detection model for the primary camera data, indicating that the probability that the target object is a human is greater than a probabilistic threshold:
            access secondary camera data captured by a secondary camera of the multiple cameras, the secondary camera data including the target object at a different perspective from the primary camera data; and
            provide, as the input to the human detection model, the secondary camera data; and;
        execute a fail-safe action in the environment responsive to the determination, provided by the human detection model, indicating that the target object is a human, including responsive to the probability indicator, provided by the human detection model for the secondary camera data, indicating that the probability that the target object is a human is greater than a secondary probabilistic threshold different from the probabilistic threshold applied for the primary camera data.

2. The system of claim 1, wherein the instructions, when executed, cause the computing system to execute the fail-safe action in the environment responsive to both:
    the determination, provided by the human detection model, indicating that the target object is a human; and
    a determination that a position of the target object within the environment is located within a threshold distance from a fail-safe boundary in the environment.

3. The system of claim 2, wherein the instructions, when executed, further cause the computing system to determine the position of the target object within the environment through a triangulation process via the camera data captured from the multiple cameras in the environment.

4. The system of claim 3, wherein the instructions, when executed, cause the computing system to perform the triangulation process by:
    accessing a first 2-dimensional (2D) camera frame of the camera data that depicts the target object, wherein the first 2D camera frame is captured by a first camera of the multiple cameras;
    accessing a second 2D camera frame of the camera data that depicts the target object, wherein the second 2D camera frame is captured by a second camera of the multiple cameras different from the first camera; and
    triangulating a 3-dimensional position of the target object from the first 2D camera frame and the second 2D camera frame based on positioning of the first and second cameras within the environment.

5. A method comprising:
    by a computing system:
        accessing camera data captured by multiple cameras positioned within an environment during an active phase, wherein the camera data captured during the active phase includes a target object, including accessing primary camera data captured by a primary camera of the multiple cameras, the primary camera data including the target object;
        providing the camera data that includes the target object, including the primary camera data, as an input to a human detection model, wherein the human detection model is configured to provide a determination indicative of whether a given object within a view of a camera in the environment is a human or not, wherein the determination provided by the human detection model is a probability indicator indicative of a probability that the given object within a view of a camera in the environment is a human or not;
        in response to the probability indicator, provided by the human detection model for the primary camera data, indicating that the probability that the target object is a human is greater than a probabilistic threshold:
            accessing secondary camera data captured by a secondary camera of the multiple cameras, the secondary camera data including the target object at a different perspective from the primary camera data; and
            providing, as the input to the human detection model, the secondary camera data; and
        executing a fail-safe action in the environment responsive to the determination, provided by the human detection model, indicating that the target object is a human, including executing the fail-safe action in the environment responsive to the probability indicator, provided by the human detection model for the secondary camera data, indicating that the probability that the target object is a human is also greater than the probabilistic threshold.

6. The method of claim 5, comprising executing the fail-safe action in the environment responsive to both:
the determination, provided by the human detection model, indicating that the target object is a human; and
a determination that a position of the target object within the environment is located within a threshold distance from a fail-safe boundary in the environment.

7. The method of claim 6, further comprising determining the position of the target object within the environment through a triangulation process via the camera data captured from the multiple cameras in the environment.

8. The method of claim 7, comprising performing the triangulation process by:
accessing a first 2-dimensional (2D) camera frame of the camera data that depicts the target object, wherein the first 2D camera frame is captured by a first camera of the multiple cameras;
accessing a second 2D camera frame of the camera data that depicts the target object, wherein the second 2D camera frame is captured by a second camera of the multiple cameras different from the first camera; and
triangulating a 3-dimensional position of the target object from the first 2D camera frame and the second 2D camera frame based on positioning of the first and second cameras within the environment.

9. The method of claim 5, further comprising:
accessing camera data captured by the multiple cameras positioned within the environment during a learning phase;
generating training data based on the camera data captured by the multiple cameras during the learning phase; and
constructing the human detection model using the training data.

10. A non-transitory machine-readable medium comprising instructions that, when executed by a processor, cause a computing system to:
access camera data captured by multiple cameras positioned within an environment during an active phase, wherein the camera data captured during the active phase includes a target object;
provide, as an input to a human detection model, the camera data that includes the target object, wherein the human detection model is configured to provide a determination indicative of whether a given object within a view of a camera in the environment is a human or not;
determine a position of the target object within the environment through a triangulation process via the camera data captured from the multiple cameras in the environment, including performing the triangulation process by:
accessing a first 2-dimensional (2D) camera frame of the camera data that depicts the target object, wherein the first 2D camera frame is captured by a first camera of the multiple cameras;
accessing a second 2D camera frame of the camera data that depicts the target object, wherein the second 2D camera frame is captured by a second camera of the multiple cameras different from the first camera; and
triangulating a 3-dimensional position of the target object from the first 2D camera frame and the second 2D camera frame based on positioning of the first and second cameras within the environment; and
execute a fail-safe action in the environment responsive to both:
the determination, provided by the human detection model, indicating that the target object is a human; and
a determination that the position of the target object within the environment is located within a threshold distance from a fail-safe boundary in the environment.

11. The non-transitory machine-readable medium of claim 10, wherein the determination provided by the human detection model is a probability indicator indicative of a probability that the given object within a view of a camera in the environment is a human or not.

12. The non-transitory machine-readable medium of claim 11, wherein the instructions cause the computing system to:
access primary camera data captured by a primary camera of the multiple cameras, the primary camera data including the target object;
provide, as the input to the human detection model, the primary camera data;
in response to the probability indicator, provided by the human detection model for the primary camera data, indicating that the probability that the target object is a human is greater than a probabilistic threshold:
access secondary camera data captured by a secondary camera of the multiple cameras, the secondary camera data including the target object at a different perspective from the primary camera data;
provide, as the input to the human detection model, the secondary camera data; and
execute the fail-safe action in the environment responsive to the probability indicator, provided by the human detection model for the secondary camera data, indicating that the probability that the target object is a human is also greater than the probabilistic threshold.

* * * * *